United States Patent
Wijnands et al.

(10) Patent No.: US 8,201,194 B2
(45) Date of Patent: Jun. 12, 2012

(54) REAL-TIME RECORDING AGENT FOR STREAMING DATA FROM AN INTERNET

(76) Inventors: Rudi J. M. Wijnands, Egchel (NL);
Stephen R. Cumpson, Eindhoven (NL);
Johannes H. M. Korst, Eindhoven (NL)

(*) Notice: Subject to any disclaimer, the term of this patent is extended or adjusted under 35 U.S.C. 154(b) by 838 days.

(21) Appl. No.: 10/540,316

(22) PCT Filed: Jan. 5, 2004

(86) PCT No.: PCT/IB2004/000013
§ 371 (c)(1),
(2), (4) Date: Jun. 21, 2005

(87) PCT Pub. No.: WO2004/061545
PCT Pub. Date: Jul. 22, 2004

(65) Prior Publication Data
US 2006/0146787 A1 Jul. 6, 2006

Related U.S. Application Data

(60) Provisional application No. 60/438,214, filed on Jan. 6, 2003.

(51) Int. Cl.
*H04H 60/32* (2008.01)
(52) U.S. Cl. ............... 725/19; 725/14; 725/46; 370/352
(58) Field of Classification Search .................. 370/352; 725/14, 19, 46
See application file for complete search history.

(56) References Cited

U.S. PATENT DOCUMENTS

| | | | | |
|---|---|---|---|---|
| 6,100,941 A * | 8/2000 | Dimitrova et al. | ............ | 348/700 |
| 6,128,650 A * | 10/2000 | De Vos et al. | .................... | 725/93 |
| 6,212,327 B1 * | 4/2001 | Berstis et al. | ................... | 386/83 |
| 6,337,947 B1 * | 1/2002 | Porter et al. | ..................... | 386/55 |
| 6,681,396 B1 * | 1/2004 | Bates et al. | ..................... | 725/58 |
| 6,792,469 B1 * | 9/2004 | Callahan et al. | .............. | 709/231 |
| 2001/0049826 A1 | 12/2001 | Wilf | | |
| 2002/0023230 A1 | 2/2002 | Bolnick et al. | | |
| 2002/0040475 A1 | 4/2002 | Yap et al. | | |
| 2002/0047899 A1 * | 4/2002 | Son et al. | ...................... | 348/114 |
| 2002/0083060 A1 * | 6/2002 | Wang et al. | .................... | 707/10 |

(Continued)

FOREIGN PATENT DOCUMENTS

EP 1091584 A2 4/2001

(Continued)

OTHER PUBLICATIONS

Salembier et al; "Description schemes for video programs, users and devices", Signal processing imnage communication 16 (2000), 211-234.

(Continued)

*Primary Examiner* — Pankaj Kumar
*Assistant Examiner* — Sahar Baig
(74) *Attorney, Agent, or Firm* — Nixon Peabody LLP

(57) ABSTRACT

A personal recorder/playback system (10) includes a recording agent (32) configured to transparently receive multiple audio/visual streams from analog and/or digital sources. The streams are temporarily stored in queues (52,54) for subsequent analysis. The streams, after analysis, are either discarded, stored permanently in an audio/visual collection (48, 50), or used to improve the quality of previously stored streams in the collection. The recording agent (32) provides features such as virtual channels (42) and a "top-ten" list (38) of most popular stored audio/visual streams.

16 Claims, 6 Drawing Sheets

U.S. PATENT DOCUMENTS

| | | |
|---|---|---|
| 2002/0099555 A1 | 7/2002 | Pitman et al. |
| 2002/0133824 A1 | 9/2002 | Mensch |
| 2002/0184636 A1* | 12/2002 | Vogel .............................. 725/51 |
| 2003/0037333 A1* | 2/2003 | Ghashghai et al. ............. 725/46 |
| 2004/0019497 A1* | 1/2004 | Volk et al. ......................... 705/1 |
| 2004/0105661 A1* | 6/2004 | Seo et al. ......................... 386/95 |

FOREIGN PATENT DOCUMENTS

| | | |
|---|---|---|
| GB | 2343074 | 4/2000 |
| WO | WO9939466 | 8/1999 |
| WO | WO0167756 A2 | 9/2001 |
| WO | WO02102079 A1 | 12/2002 |

OTHER PUBLICATIONS

Hayes et al; "Smart radio-building music radio on the fly", Computer science Dept., Trinity College Dublin.

Bsoch et al; "Real-time disk scheduling in a mixed-media file system", Sixth IEEE Real Time Technology & Applications Symposium RTAS May 31-Jun. 2, 2000, Wash. DC.

* cited by examiner

REAL-TIME RECORDING AGENT FOR STREAMING DATA FROM AN INTERNET

CROSS REFERENCE TO RELATED APPLICATION

This application claims the benefit of U.S. provisional application Ser. No. 60/438,214 filed Jan. 6, 2003, which is incorporated herein by reference.

The present invention relates to the field of image display systems; more specifically, it relates to a method and system for controlling the contrast of pixels in a displayed image.

This invention relates to the recording of audiovisual and audio streams from broadcast sources such as radio and TV stations or the Internet. In particular it relates to real-time recording of video and music titles for replay at a later time.

The present invention relates to streaming content such as Internet radio and TV, and in particular, to a method of providing viewers with improved methods of recording titles according to a user's preferences and listening or viewing habits.

The quantity of streaming content available over the Internet and other sources such as cable television and satellite has increased rapidly in recent years. Recent bandwidth and technology improvements have made Internet multimedia more viable for everyday use. Inexpensive cable modems, DSL modems and direct broadcast satellite (DBS) dishes have brought high-speed Internet access into homes, thus eliminating bandwidth constraints.

Streaming content like Internet radio and TV are, therefore, becoming more and more popular. Radio stations are transmitting their program via the Internet. Some radio stations even transmit only via the Internet. The same phenomenon is happening with video content.

Currently a user can typically only listen to a single radio station or TV station. It is not an easy task to find a radio or TV station that is transmitting a song or film of a favored artist. As a result, users oftentimes miss a desired song or film, or miss a portion of it because connection to the station was made midway through broadcasting of the song or film.

In the past, users have relied on pre-printed program listings for TV content, however, there are numerous disadvantages in using an external paper-based information source which is updated usually once a week. Pre-printed listings for songs broadcast by radio stations would be even more cumbersome for the user. In recent years, electronic program guides have been developed, however, these are still not user friendly and require advance planning on the part of the user. Additionally, the search capabilities with such guides are manual and interrupt the viewing and listening experience of the user. Also, manual techniques are very limited in the present day situation where hundreds of video and audio sources are available.

Windows applications exist that can record individual Internet radio streams. However, the user is responsible for manually setting up the connection and starting and stopping the recording of such a stream.

It is desirable, therefore, to provide a system and method that provides an improved method of receiving analog or digital audio/visual streams that match a user's preferences.

It is further desirable to provide a system and method that provides an improved method of playing audio/visual streams that match selective user preferences.

A personal recording and playback system is provided having a receiving means (19, 21) for receiving streaming audio/visual input from at least one of: broadcast radio, broadcast TV stations, cable TV systems, satellite TV systems, the Internet, and other wide-area networks. The system also includes a means (21) for connecting to wide area networks, including the Internet, and receiving streaming audio or audio/visual input. A storage means (36) stores the received streaming audio or audio/visual input. A user input means (12) provides for inputting user commands to the recording/playback system (10) and a user output means (14) provides for outputting the audio or audio/visual input. A recording means (32) transparently: tracks audio or audio/visual preferences of a user of the system (10); maintains a user profile database (34) for storing and maintaining user preferences; receives multiple audio or audio/visual streams via the receiving means (19, 21); and stores the received multiple audio or audio/visual streams on the storage means (36), in the background. The system maintains an audio or audio/visual recording collection (48,50) according to the user preferences by analyzing the received audio/visual streams.

An embodiment of the personal recording and playback system (10) includes a receiver (19,21) which receives streaming audio or audio/visual input from at least one of: analog broadcast radio/TV stations, cable TV systems, satellite TV systems, and Internet servers. A memory (36) is included in which the received streaming audio or audio/visual input is stored; a user input/output (12,14) is included through which user commands and queries are input and audio or audio/visual streams and queries are output. A processor (32) is programmed to: track audio or audio/visual preferences of a user of the system (10), maintain a user profile database (34), receive multiple audio or audio/visual streams in the background via the receiver (19,21) and store the received multiple audio or audio/visual streams in the memory (36) and, maintain an audio or audio/visual recording collection (48,50) in the memory according to the user preferences by analyzing the received audio/visual streams.

A method for maintaining an audio/visual collection is provided, comprising: receiving one or more audio or audio/visual streams in a background process transparent to a user; storing the received audio or audio/visual streams for subsequent analysis; monitoring the playback preferences of the user; maintaining a user preference profile including the user playback preferences; storing and maintaining the audio or audio/visual streams in a video/audio collection (48, 50); analyzing and matching the recorded audio or audio/visual streams to the user preference profile, and, at least one of: discarding the queued stream if unmatched to a user preference; storing the queued stream in the audio or audio/video collection if matched to a user preference and not previously stored in the audio/video collection; or, using the queued stream to selectively improve a matching, previously stored audio or audio/visual stream in the audio or audio/video collection; and, playing the stored audio or audio/visual streams.

One advantage of the present invention is that it provides an improved method of receiving preferred audio/visual streams without user action.

Another advantage is that the present invention provides improved methods of playback of audio/visual streams such as virtual channels and a most-popular list.

Yet another advantage provided by the present invention is the automatic recording of audio/visual streams to a collection, and the automatic improvement of recorded audio/visual streams, performed transparently from the view of the user so that advantages of the present invention are provided without user intervention.

Still further advantages of the present invention will become apparent to those of ordinary skill in the art upon reading and understanding the following detailed description of the preferred embodiments.

The invention may take form in various parts and arrangements of parts. The drawings are only for purposes of illustrating a preferred embodiment and are not to be construed as limiting the invention.

Figure 1:
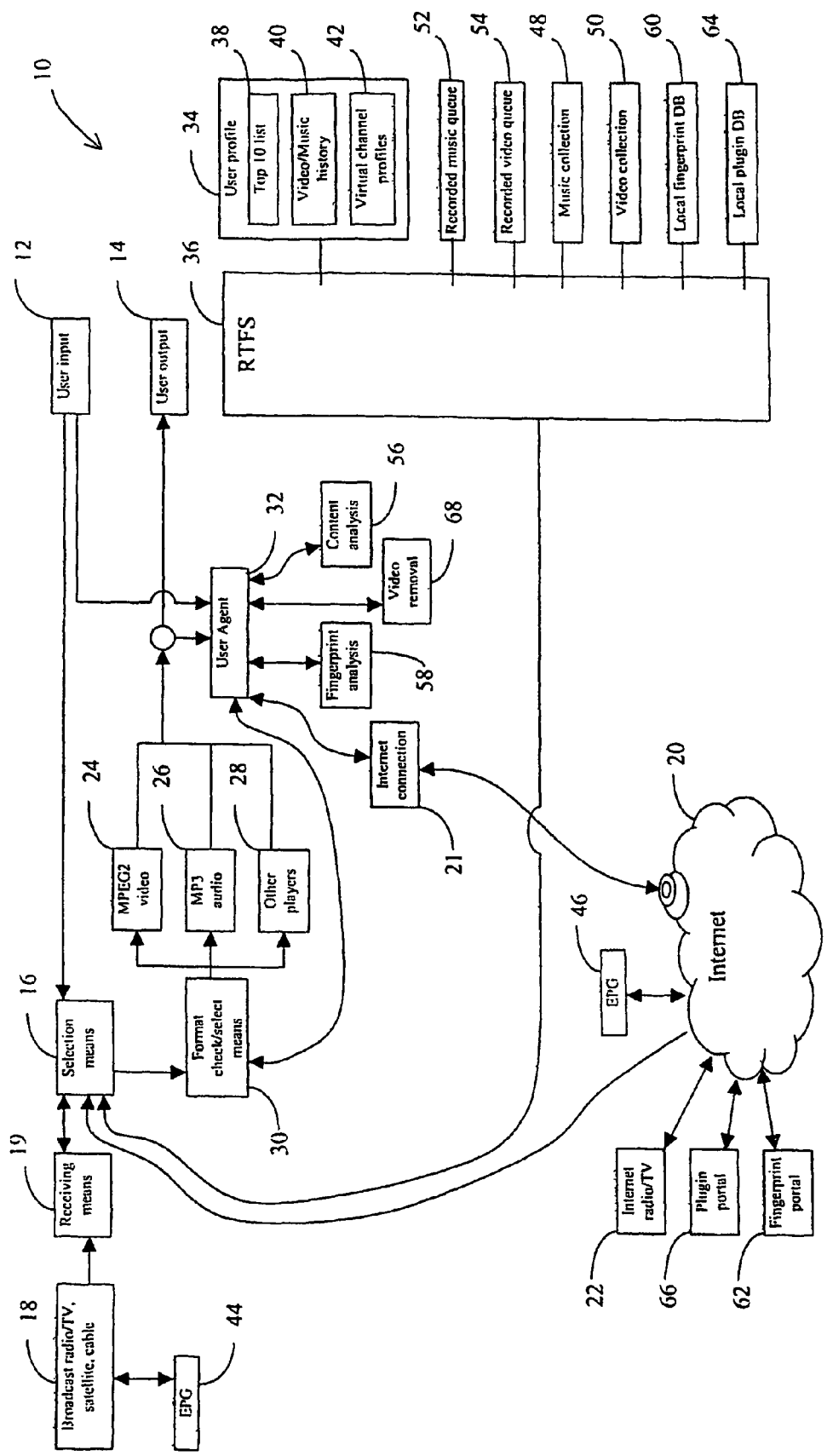
FIG. 1 is a block diagram of a personal recorder/playback system in accordance with the present invention.

An audio/visual system for receiving streaming content for sources such as, Internet radio and Internet TV is shown in FIG. 1. The audio/visual system 10 includes a user input device 12 for selecting sources for listening, viewing, and recording and for otherwise controlling the system 10. The audio/visual system 10 also includes a user output device 14 including speakers and a display device. User input device 12 utilizes a selection means 16 for selecting sources and channels of audio or visual titles to be recorded and viewed. The selection means 16 may connect to sources such as broadcast radio and TV stations 18 via a broadcast receiver component 19, including satellite and cable stations. Sources also include those connected to on the Internet 20 via a network connection component 21, such as Internet radio and TV stations 22.

Various video and audio players are provided in the audio video system 10 such as a video player 24 for playing MPEG2 files, an MP3 audio player 26, and other players 28 for playing various other video and audio formats. A format check means 30 is provided for examining the format of audio and visual sources received from the selection means 16 for the purpose of routing the selections to the correct player 24, 26, 28.

A recording agent 32 is provided with the audio/visual system 10, and the recording agent tracks the preferences and the profile of the user of the system 10 and maintains this in a profile database 34 on a real-time file system 36. Included in, or associated with, user profile 34, is a top-ten list 38 containing the ten most broadcasted music and/or video titles of those which are included in the user's preferences. This provides the user of the system with an indication of which titles, among the user's preferred channels, are currently most popular. Also included are a video/music history 40, containing a history of music and video played by the user, and virtual channel profiles 42, each virtual channel containing music or video titles according to the profile for the respective virtual channel. The top-ten list 38, the video/music history 40, and the virtual channel profiles 42 are explained in more detail below.

The recording agent 32 scans one or more lists of radio/TV stations such as provided by one or more satellite/cable electronic program guides 44 and one or more Internet electronic program guides 46 and determines what is being transmitted and at what times. The recording agent 32 maintains the user profile 34, and the profile provides information about favorite artists, favorite songs, favorite films, favorite series, and other information related to the user. When the recording agent 32 has sufficient information from the electronic program guides 44 and 46 to identify music or video titles that match the profile of the user, the user recording agent 32 records the content in either of a music collection 48 or a video collection 50 on the real-time file system 36. Typically, a plurality of sources are recorded concurrently and the individual songs or music videos are stored and cataloged.

A significant feature of the recording agent 32 is that the functions of scanning program guides and lists, maintaining the user profile, recording the content in the music collection 48 and the video collection 50, and other necessary functions are performed in a background process, transparent to the user. Thus, the user is not negatively impacted by operations of the recording agent 32, and the user is provided an improved listening and/or viewing experience because of the actions of the recording agent.

The recording agent 32, while recording music and video titles to the music collection 48 or the video collection 50, is responsible for not recording duplicates. However, rather than ignoring a title that is known to have been stored in either collection previously, the recording agent 32 uses a number of methods to determine if the stored title can be improved. For example, if the title was recorded from a lower quality analog source, but the current title is being recorded from high quality digital source, the recording agent 32 then replaces the title in a collection with the title of improved quality. In the preferred embodiment, the recording agent 32 records music and video titles into a music queue 52 or a video queue 54 for analysis after recording the full title. For example, a song and music collection 48 may be of good quality. However, the beginning of the song or the ending of the song may have a voice-over on it. For example, when a DJ is still talking as he starts playing a selection. In this event, the recording agent 32, after recording a duplicate title in the music queue 52, uses an analysis program 56 to splice the title in the music queue 52 with the title in the music collection 48 in order to eliminate any voice-over portions in the title, thereby improving the user's listening experience. Commercials, laugh tracks, and the like are removed analogously.

The analysis program 56 similarly compares a title in the music collection 48 to one recently stored in the music queue 52 and removes defects of any sort in the title stored in the music collection 48. A section of the same title stored in the music queue 52 can be spliced into or averaged with the title in the collection 48 to improve the quality of it. Similar techniques may be used to improve the quality of collections in the video collection 50 by matching or splicing from collections recently stored in the video queue 54. Recordings in the music queue 52 and the video queue 54 are, however, only temporarily stored in real-time file system 36 and are discarded shortly after analysis. Alternately, the titles from multiple sources can be redundantly recorded in a common memory and duplicates and non-profile titles removed in a later or continuous processing operation.

It is not always possible for the recording agent 32 to determine the exact nature of a title being provided by the broadcast systems 18 or the Internet radio and TV systems 22 in order to determine if it fits the user profile. It is not always possible to determine the exact beginning or end of a radio or TV program or of a song or film. In these cases, the recording agent 32 utilizes the music queue 52 and/or the video queue 54 to record these selections completely, and then perform content analysis, using the analysis program 56, afterwards. Using a real-time file system such as the real-time file system 36 is advantageous for embodiments of the present invention because a real-time file system allows the recording agent 32 to simultaneously record and play back multiple streams in real time. Real-time file systems are well known in the art and any number of real-time file systems may be incorporated into embodiments of the present application.

The recording agent 32 will not always have an accurate identification of a title being broadcast in a streaming format. In these cases, the recording agent 32 utilizes a fingerprint analysis program 58 in order to quickly analyze the broadcast stream and determine the title (e.g. the name of the song and the artist) by utilizing an audio fingerprint database. The recording agent 32, in a preferred embodiment, maintains a local fingerprint database 60 on the real-time file system 36 so that streaming titles may be quickly identified and matched to titles that have been previously stored or analyzed. If the fingerprint analysis program 58 is unable to identify a title by utilizing local fingerprint database 60, it then connects to one or more fingerprint portals 62 on the Internet in order to perform additional fingerprint analysis on the streaming title. If the title cannot be identified in this fashion, the recording agent 32 can either discard the title or, at a convenient time, may query the user of the system for a title or permission to discard the title.

The recording agent 32 must also deal with the problem of different streaming formats. For example, FIG. 1 shows an MPEG2 video player 24 and an MP3 audio player 26.

However, many other formats are available for streaming, and new formats are being developed each day. It is therefore necessary and advantageous to be able to support other players 28 for other streaming formats and presently unknown streaming formats. To accomplish this, the recording agent 32 maintains a plug-in database 64 on the real-time file system 36. The plug-in database 64 includes modules that can decode a variety of streaming formats. If the recording agent 32 encounters a format for which it does not have an available plug-in on the plug-in database 64, it accesses, via Internet 20, one or more plug-in portals 66 for retrieving and updating its plug-in database 64. The plug-ins are then used by the recording agent 32 and the format check 30 for decoding a variety of streaming formats.

The recording agent 32 is also responsible for maintaining the top-ten list 38. The top-ten list includes the ten most frequently broadcasted music and/or video titles among those preferred by the user as previously described. Although this is referred to in the present application as a top-ten list, this is for exemplary purposes only and the user may configure the number of titles to be included in the top-ten list. The recording agent 32 utilizes information gathered while scanning titles from the above-described sources to maintain a broadcast count for each title and also maintains and utilizes the video/music history 40 for purposes of maintaining the top-ten list. In this fashion, then the user of the system 10 is provided an improved listening or viewing experience by being able at any time to listen to or view the ten currently most popular recorded selections from the top-ten list 38.

The user of the system 10 may define the virtual channel profiles 42 wherein each profile includes specifications unique to that profile. For example, one profile might be for country-western music, thereby providing a virtual country-western channel. The recording agent 32 can then maintain the virtual channel that records streams in the music queue 52 or the video queue 54 and perform content analysis using the content analysis program 56 to determine if a selection matches one of the virtual channel profiles. Selections may then either be discarded or added to the music collection 48 or the video collection 50 if they match one of the virtual channels. This enhances the user experience wherein the user, in this example, can listen to country-western music without having to select a particular broadcasting station and, in fact, can listen to selections that have been recorded from numerous broadcasting stations.

For stations that broadcast a variety of music types, this feature is advantageous because it categorizes the selections that have been played and, if the user desires, can select a virtual channel that conforms to one of the categories of music and listen only to those selections at a particular time. As another option, a profile can be set up for a single composer, e.g. Mozart, and a collection of the selected composer's pieces collected. Similarly, a profile can be set up for a single singer and the fingerprints used to identify her singing.

In addition to being able to record radio stations and develop the music collection 48 from music broadcast on radio stations, the recording agent 32 utilizes a video removal tool 68 for subtracting the video from an audio/visual broadcast from a source such as MTV thereby leaving only the audio portion. The audio portion then may be further analyzed by the content analysis 56 or the fingerprint analysis 58 for further processing by the recording agent 32 and updating of the music collection 48. In this manner, the user then can listen to the music portion of a video as if it were part of the music collection stored from a radio source.

Figure 2:
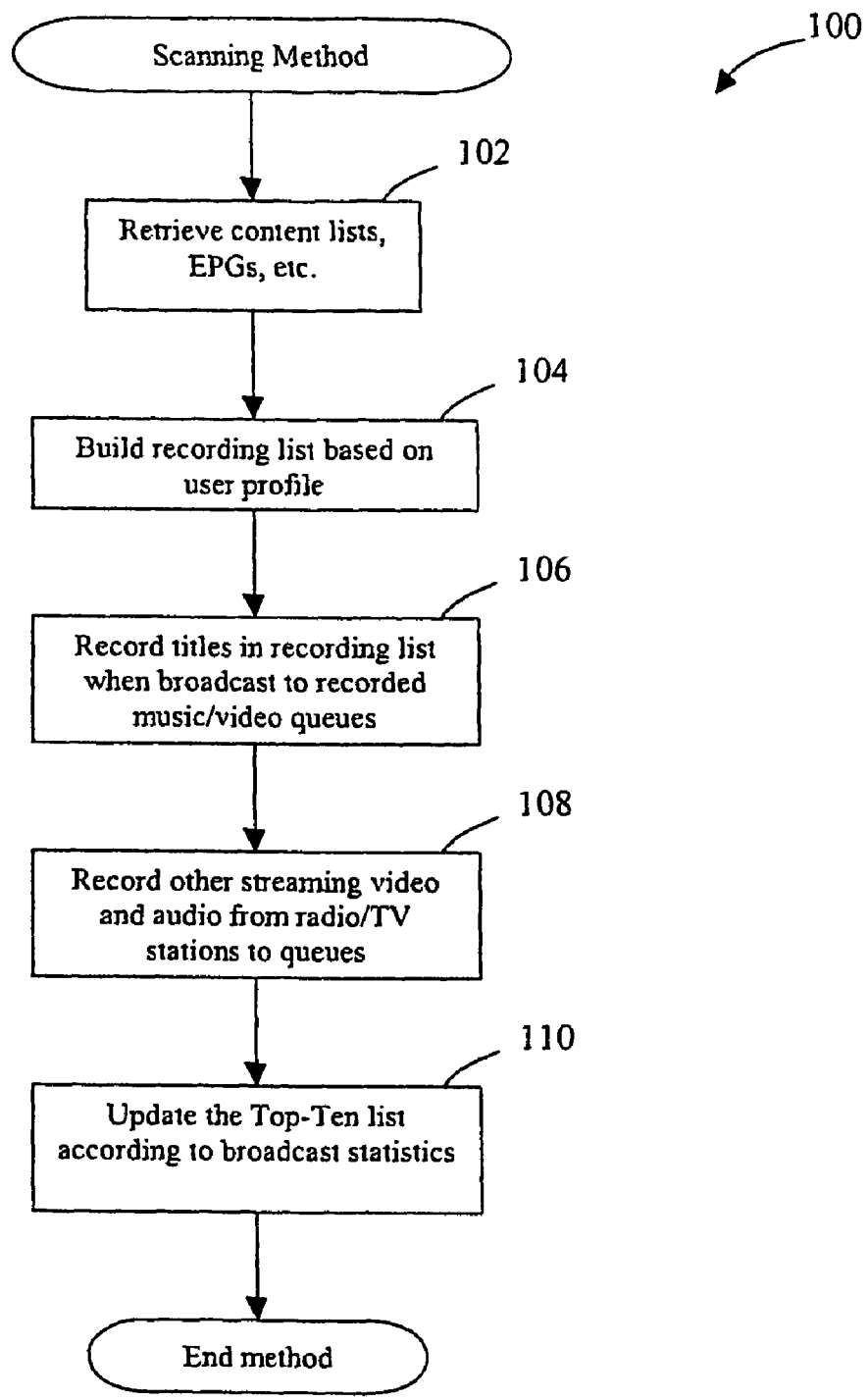
FIG. 2 is a flow chart of a recording agent scanning method according to the present invention.

FIG. 2 contains a flow diagram of a background scanning method 100 suitable for incorporation into the recording agent 32 for maintaining the music collection 48 and the video collection 50. The scanning method 100 operates in the background without intervention from the user input device 12. It operates invisibly in the background without disturbing the user and transparently records video and audio streams and updates the music collection 48 and the video collection 50.

In step 102, scanning method 100 retrieves content lists or electronic program guides from broadcast TV such as provided on cable or satellite and from the Internet 20. Electronic programming guides may be found on Internet sites such as windowsmedia.com and bloomberg.com, and many others. Once scanning method 100 has retrieved content lists from various sources, step 104 builds a recording list based on known information from the electronic program guides and the user profile. In step 106, the scanning method records titles in the recording list when they are broadcast to either of the music queue 52, or the video queue 54, for later analysis. Preferably, multiple audible streams are recorded simultaneously. This is made possible by the use of the real-time file system 36. While step 106 is recording titles of which sufficient information is known to match them to the users profile, it is often the case that video or audio information is being streamed without sufficient advance information to know the title or the quality of the stream, or whether it fits the users profile. In step 108, these other streams are recorded to the music queue 52 and the video queue 54 for fingerprint and content analysis. It is the responsibility of the recording agent 32 to maintain the top-ten list 38 and, accordingly, updates the list 38 when necessary at step 110 based on the user preferences and broadcast statistics maintained for each recorded title.

Figure 3:
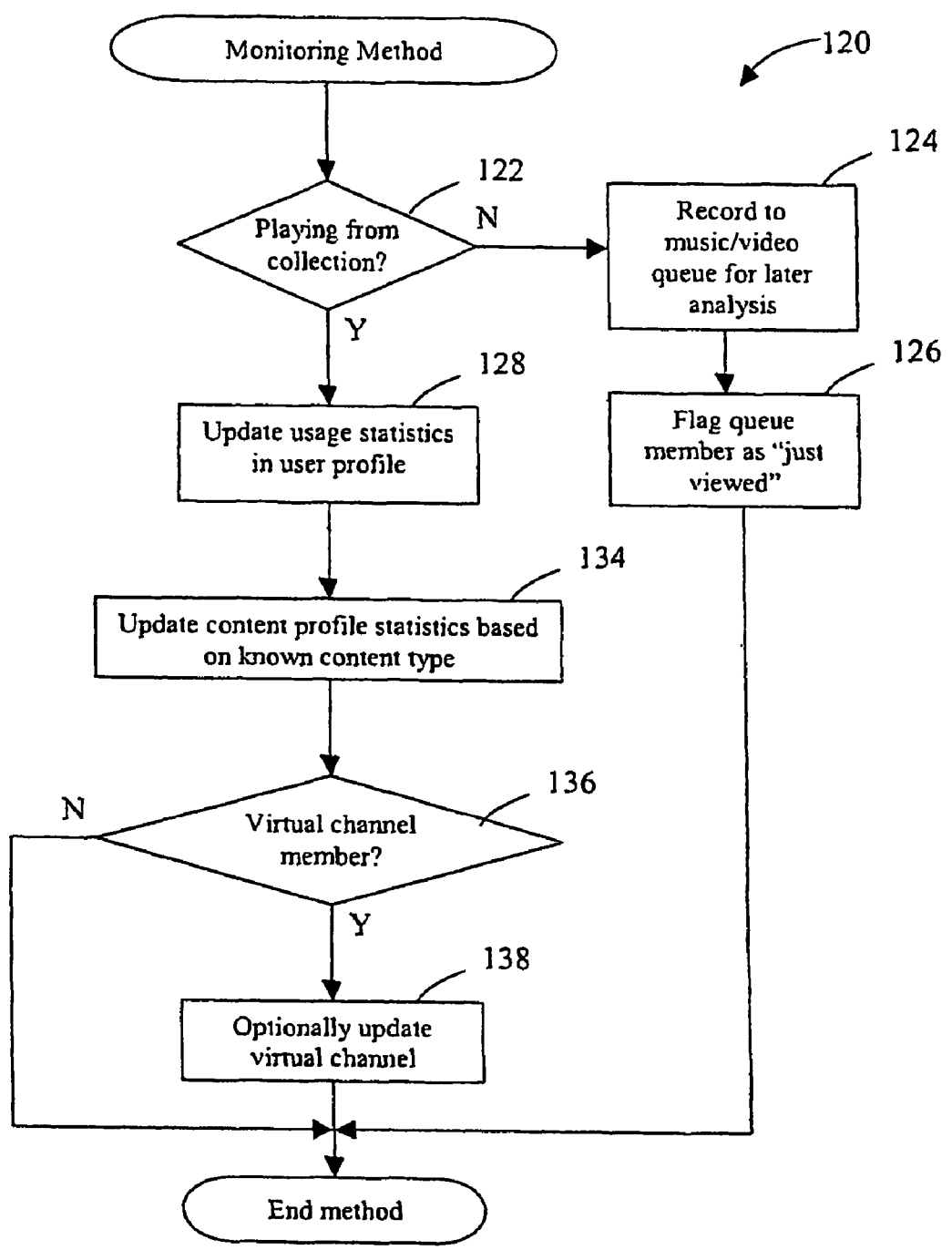
FIG. 3 is a flow chart of a recording agent monitoring method according to the present invention.

The recording agent 32 is responsible for monitoring the viewing and listening habits of a user. A monitoring method 120 suitable for incorporation into the recording agent 32 for monitoring the users activity, as shown in FIG. 3, monitors all song titles and videos viewed by the user, whether the user is playing from the collection 48, the collection 50, or playing a selection being broadcast by the broadcast sources 18 or the Internet radio resources 22. At step 122, the monitoring method 120 determines if the user is playing a source from either the music collection 48 or the video collection 50 as opposed to a source from the broadcast sources 18 or the Internet 20 if the user is not playing a video or song title from the personal collections 48 and 50. At step 124, the monitoring method records the music/video to either music queue 52 or the video queue 54 for later analysis. It is to be appreciated that if sufficient information about the title is available from either fingerprinting or from an electronic program guide to determine that the user would preferably not want to add this to the present collection, the recording step 124 and the succeeding step 126 may be omitted or bypassed. At step 126 the stored music or video collection is flagged as "just viewed" for later update of the video/music history 40.

If, on the other hand, step 122 determines that the user was playing a selection from the existing music collection 48 or the video collection 50, step 128 is invoked to update the users usage statistics in the user profile 34, thereby maintaining an accurate video/music history 40. Any relevant content profile statistics maintained in the user profile 34 are updated in step 134. The monitoring method 120 optionally includes step 136 which queries whether the played title is a member of one of the virtual channel profiles 42. If the answer is in the affirmative, at step 138, the monitoring method updates optional virtual channel statistics in the virtual channel profiles 42.

Figure 4:
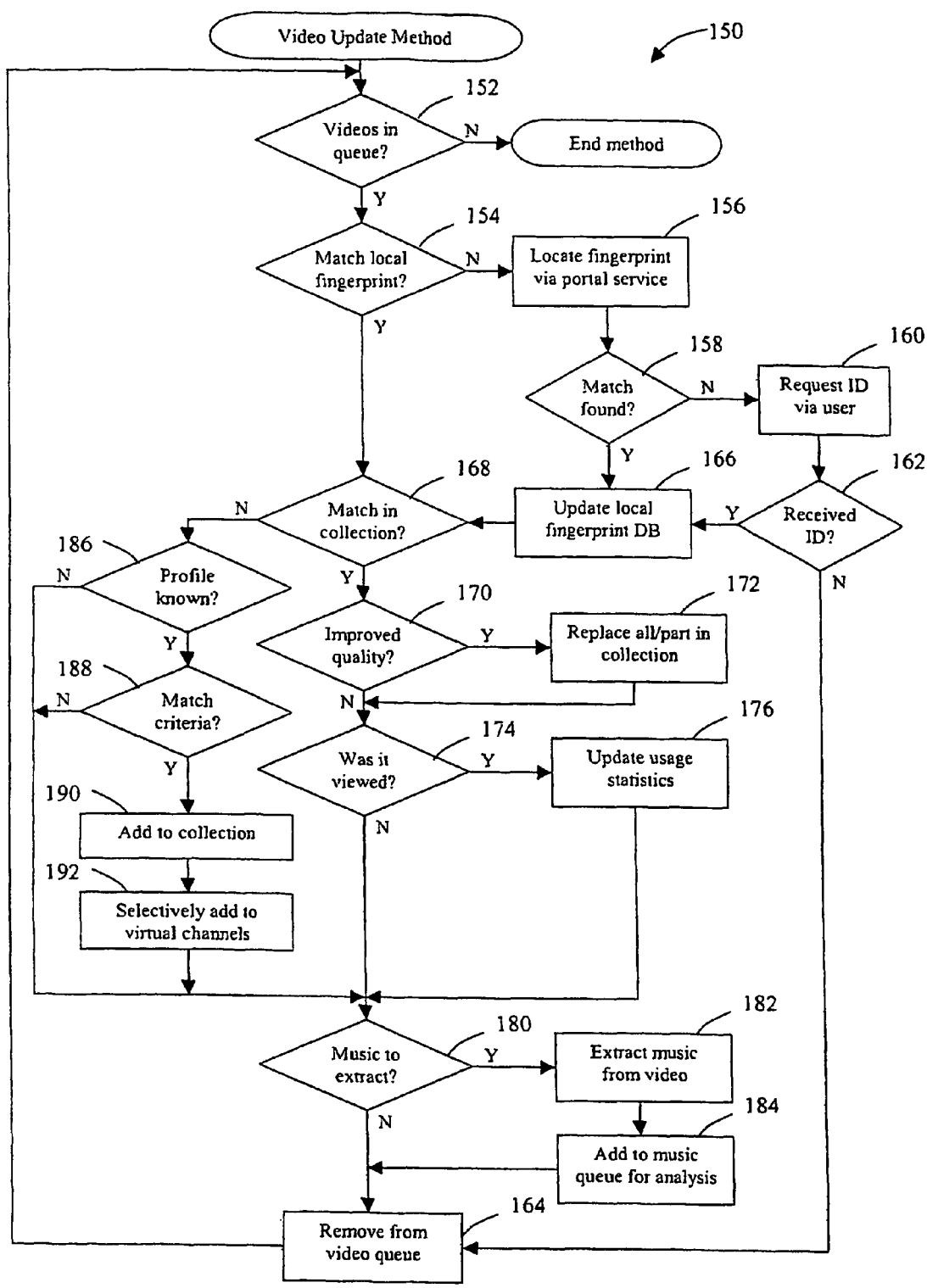
FIG. 4 is a flow chart of a recording agent video update method according to the present invention.

As discussed earlier, it is the responsibility of the recording agent 32 to update the music collection 48, the video collection 50, the virtual channel profiles 42 and the video/music history 40. A video update method 150 is shown in FIG. 4, suitable for incorporation in the recording agent 32 for accomplishing this task. A first step 152 of the video update method 150 is to determine if there are any stored videos in the video queue 54. If the answer is in the negative, no further processing is required. However, if the answer is in the affirmative, step 154 is invoked which determines if the selection matches a fingerprint in the local fingerprint database 60. If a match cannot be found, step 156 is invoked to locate a fingerprint via one of the fingerprint portals 62. Step 158 queries whether a fingerprint is available. If not, step 160 optionally requests an I.D. via the user output device 14 and the user input device 12. At step 162, it is determined if the user provided an I.D. If not, step 164, at the end of the method, removes the selection from the video queue 54. Similarly, because steps 160 and 162 are optional, if step 158 determines that a fingerprint cannot be found, a typical default for the video update method 150 would be to invoke step 164 and simply remove the video from the video queue 54.

If a fingerprint was found via the portal services 62, step 166 adds the fingerprint to the local fingerprint database 60. Once a fingerprint has been determined for the video selection being analyzed, either from local fingerprint database 60 or from the fingerprint portal 62, step 168 is invoked to determine if the selection matches an existing entry in the users video collection 50. If, in step 168, it is determined that the recorded entry in the video queue matches an existing entry in the video collection 50, step 170 determines if the recorded video in the video queue 54 is an improved quality version either partially or completely over the existing entry. If it is determined that the existing entry in the video collection 50 can be improved upon, step 172 is invoked where all or part of the existing entry in video collection 50 is replaced by the recorded video in video queue 54. Step 174, determines whether the member in the video queue 54 is flagged as "just viewed" and, if so, step 176 is invoked to update usage statistics for the video in the user profile 34. The next step after step 174 or step 176 is step 180 which determines if there is music on the video to extracted and possibly added to the music collection 48. If the answer is in the affirmative, step 182 utilizes video removal tool 68 to extract music titles from the video in the video queue 54 and, in step 184, places the extracted music in the music queue 52 for later analysis. After step 180 or 184, step 164 removes the entry in the video queue 54, and processing returns to step 152 to examine any subsequent entries in the video queue 54.

Returning to step 168, if it is determined that the entry from the video queue 54 does not match any existing entries in the video collection 50, then it is known that this is a new entry and step 186 is invoked. Step 186 determines whether or not a profile of the entry in the music queue 54 is known. If it was previously indeterminable whether the music matched a profile in the user profile 34, and it is not possible to determine whether the music is to be collected as part of the music collection 48, processing continues at step 180 to determine if there is any music to be extracted from the video. Otherwise, step 188 is invoked to determine if the profile associated with the entry in the music queue 54 matches selection criteria according to any of the users profiles such as the virtual channel profiles or any alternate selection criteria. If it is determined that the video in the video queue 54 does match a selection criteria, step 190 adds the video to the video collection 50. Subsequently, step 192 determines which, if any, virtual channels are appropriate for this video. The video is added to any virtual channels to which its profile matches. Processing then continues at step 180, as previously described to determine if music is to be extracted from the video.

Figure 5:
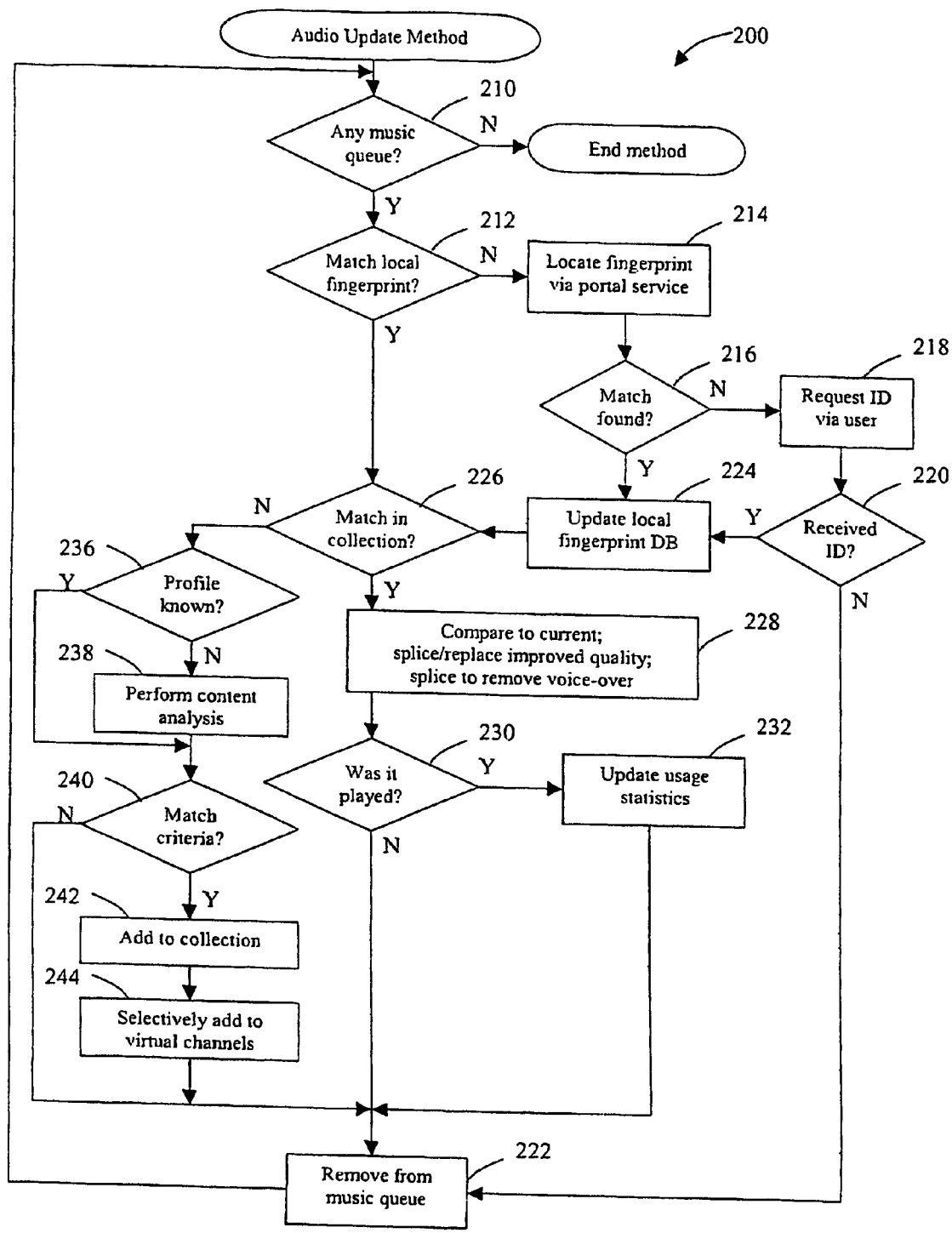
FIG. 5 is a flow chart of a recording agent audio update method according to the present invention.

The above described video update method 150 is accompanied by a similar audio update method 200 as presented in FIG. 5. The first step in the audio method 200 is to determine, at step 210, if there are any music selections in the music queue 52. If there are none, no further processing is required. However, if there are, step 212 determines if the music matches any fingerprints in the local fingerprint database 60. If not, step 214 attempts to locate a fingerprint via the fingerprint portal services 62. If step 216 finds no fingerprint, an optional step 218 queries the user for an identification of the music title. In step 220, if no I.D. is provided, processing continues at step 222 which removes the music entry from the music queue 52. Processing returns to step 210 to examine any subsequent entries in the music queue. If an identification can be determined for the music entry in the music queue 52, step 224 is invoked and the local fingerprint database 60 is updated with a fingerprint of the current entry in the music queue 52. Following step 224 or following an affirmative determination in step 212, step 226 determines whether the music entry in the music queue 52 matches any existing entries in the music collection 48.

If the current entry in the music queue 52 does match an existing entry in the music collection 48, step 228 compares the respective recordings in order to splice or replace portions of the current music entry in the music collection 48 to improve the quality. Splicing also occurs to remove voice-over sections from the entry in the music collection 48. Step 230 determines whether or not the entry in the music queue 52 has been "just played." If so, step 232 updates usage statistics in the user profile 34. In either case, processing next continues at step 222 where the entry is removed from the music queue 52. The processing then returns to step 210 for additional processing of any entries in the queue 52.

If step 226 determines that the current entry in the music queue 52 does not match any existing entries in the music collection 48, step 236 determines whether or not a profile for the entry in the music queue 52 has been determined or is determinable. If not, additional step 238 performs content analysis using content the analysis tool 256 in order to determine profiles for the entry in the music queue 52. In either case, step 240 determines if the profile of the current entry in the music queue 52 matches any selection criteria in the user profile 34. If the answer is in the affirmative, step 242, adds the entry to the music collection 48, and step 244 adds the new entry to any virtual channels in the user profile 34 that match the profile of the new music entry. In all cases, processing continues with step 222 which removes the entry from the music queue 52. The processing again returns to step 210 for further processing.

Figure 6:
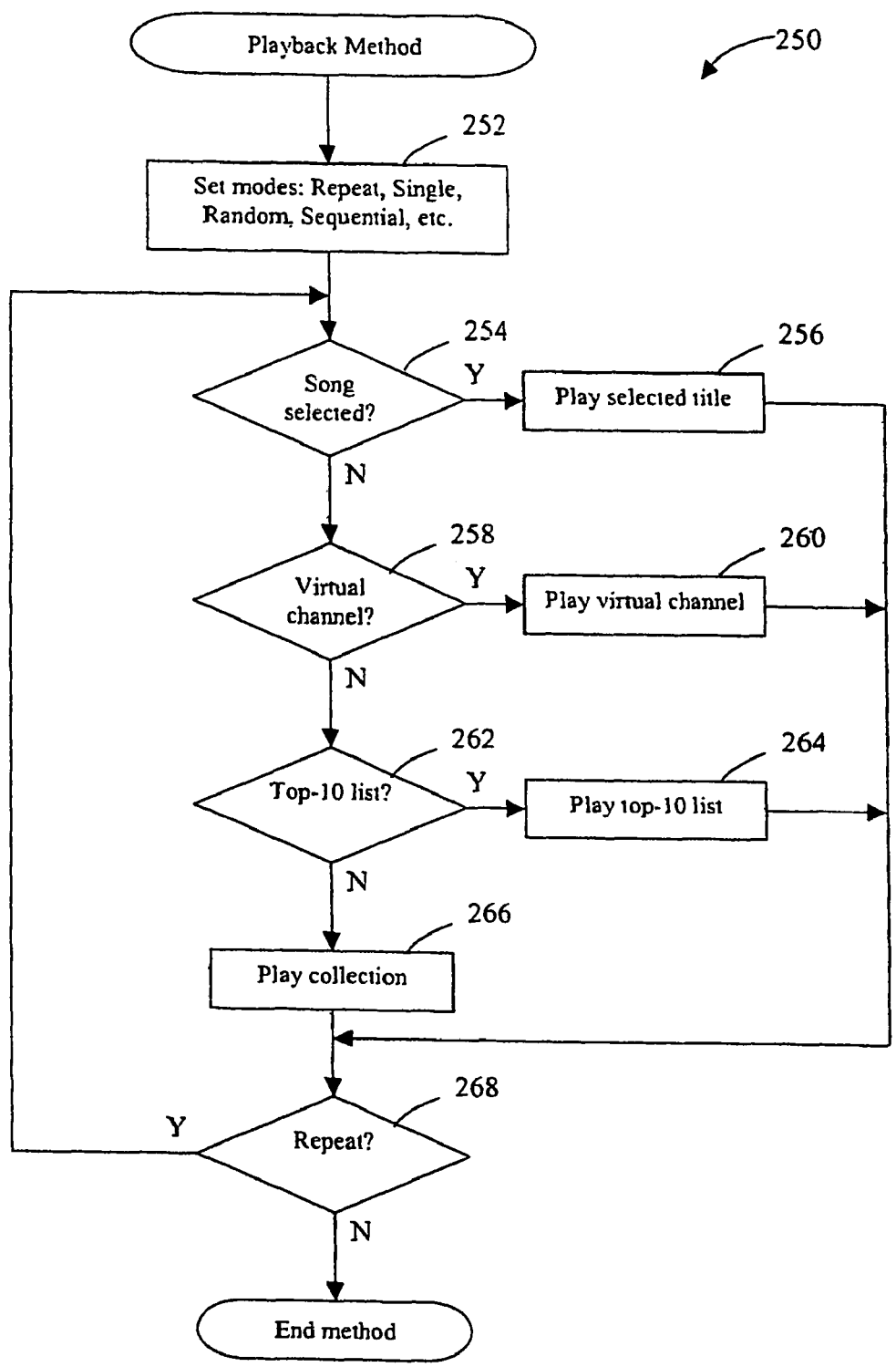
FIG. 6 is a flow chart of a recording agent playback method according to the present invention.

System 10 also includes a play back method 250 as shown in FIG. 6 that is suitable for implementation as part of the present application. At step 250, the user configures any modes of operation such as repeat play, single play, random play or sequential play, and other commonly used modes. Step 254, queries whether the user has selected a specific song. If a specific song has been selected, step 256 plays the selected song. Otherwise, step 258, queries if a virtual channel has been selected for play. If that query is in the affirmative, step 260 plays the selections in the selected virtual channel according to the modes set in 250, e.g. randomly, sequentially, etc. If the query at step 258 is in the negative, step 262 determines if the top-ten list has been selected for play. If this answer is in the affirmative, step 264 plays the top-ten list according to modes previously selected in step 252. If the query at step 262 is in the negative, step 266 plays music from the entire music collection 48 according to modes previously selected in step 252. In all cases processing continues at step 268 which determines if the user wishes the cycle to repeat. If cycle repetition is selected, processing returns to step 254 for further processing and playback. Otherwise, the method is exited at this point. The playback method 250 has been described with respect to music, however, the method is adapted equally well to video play back for music videos, TV programs, special interest videos, video clips, movies, and the like.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A personal recording and playback system (10) comprising:
 a receiving means (19, 21) for receiving streaming audio/visual input from at least one of broadcast radio, broadcast TV stations, cable TV systems, satellite TV systems, the Internet, and other wide-area networks;
 a means (21) for connecting to wide area networks including the Internet and receiving streaming audio or audio/visual input;
 a storage means (36) for storing the received streaming audio or audio/visual input;
 a user input means (12) for inputting user commands to the recording/playback system (10);
 a user output means (14) for outputting the audio or audio/visual input;
 a recording means (32) for transparently:
  tracking audio or audio/visual preferences of a user of the system (10);
  maintaining a user profile database (34) for storing and maintaining user preferences;
  receiving multiple audio or audio/visual streams via the receiving means (19, 21) and storing the received multiple audio or audio/visual streams on the storage means (36) in the background; and,
  maintaining an audio or audio/visual recording collection (48, 50) according to the user preferences by analyzing the received audio/visual streams; and
 a content analysis means (56) for examining and improving a quality of an audio or audio/visual stream stored in the recording collection and identifying at least one of: a profile of the stream, and voice over sections of the stream, degraded sections of the stream, and commercial detection,
 wherein the content analysis means (56) improves the quality of the audio or audio/visual stream stored in the recording collection by comparing a title in the audio or audio/visual recording collection (48, 50) to a title stored in a real time file system or a common memory and either:
 (i) replacing a title in the audio or audio/visual recording collection (48, 50) with a title stored in the real time file system or the common memory or
 (ii) replacing portions of the title in the audio or audio/visual recording collection in order to remove voice over portions or defects of any kind or commercials, and wherein the operation of the content analysis means and replacing of either the said title (i), or portion of the title (ii), in the audio or audio/visual recording collection, is performed without the user being required to have previously listened to, or listened to and/or watched, the said title (i) or portions of the title (ii).

2. The system as set forth in claim 1, further including:
 virtual channels (42) stored on the storage system (36), each virtual channel configured with a virtual channel profile defining the types of audio or audio/visual streams to be included in the virtual channel and, wherein the recording means further:
 updates the virtual channels by selectively including received audio or audio/visual streams in each virtual channel which matches the virtual channel profile.

3. The system as set forth in claim 1, further including:
 a most-popular list means (38) for storing the most often broadcasted audio/visual streams, and, the recording means further:
 updates the most-popular list with the most often broadcasted audio or audio/visual streams.

4. The system as set forth in claim 1, further including:
 a selection means (16) for playing audio or audio/visual streams selected by the user via the input device (12) on the user output device (14) from one of:
 the receiving means (19, 21) ; and,
 the audio/visual collection (48, 50).

5. The system as set forth in claim 4, further including:
 a fingerprint analysis means (58) for identifying audio or audio/visual streams by matching a portion or portions of the stream to fingerprints stored in one of a local fingerprint database (60) and a remote fingerprint database (62).

6. The system as set forth in claim 4, further including a video removal means (68) for removing a video portion from an audio/visual stream, leaving an audio portion.

7. The system as set forth in claim 4, further including:
 a format-check means (30) for determining and decoding a format of an audio or audio/visual stream, the formats including:
 MPEG2;
 MPEG4;
 MP3;
 Ogg Vorbis;
 DIVX;
 Realplayer Real-Video;

Realplayer Real-Audio;
Microsoft Windows Media;
Microsoft Netshow;
Apple Quicktime;
Xing StreamWorks; and
analog.

8. The system as set forth in claim 7, further including:
a plug-in database means (64) for storing and retrieving plug-ins to enable the format check means (30) to determine and decode additional audio or audio/visual stream formats.

9. A personal recording and playback system (10) according to claim 1 wherein:
the system includes a processor (32) programmed to:
track audio or audio/visual preferences of a user of the system (10);
maintain a user profile database (34);
receive multiple audio or audio/visual streams in the background via the receiver (19, 21) and store the received multiple audio or audio/visual streams in the memory (36); and,
maintain an audio or audio/visual recording collection (48, 50) in the memory according to the user preferences by analyzing the received audio/visual streams.

10. The system as set forth in claim 9, further including:
a selection processor (16) configured to select audio or audio/visual streams selected by the user to be played by the input/output (12, 14), the audio or audio/visual streams being selected from one of:
the receiver (19, 21); and,
the audio/visual collection (48, 50).

11. A method for maintaining an audio/visual collection in a device having a memory for storing audio/visual content and a processor that executes the method comprising:
receiving one or more audio or audio/visual streams in a background process transparent to a user;
storing the received audio or audio/visual streams in a memory of the device for subsequent analysis;
monitoring playback preferences of the user;
maintaining in a memory of the device a user preference profile including the user playback preferences;
storing and maintaining the audio or audio/visual streams in a audio/visual collection (48, 50) in a memory of the device;
analyzing and matching the recorded audio or audio/visual streams to the user preference profile; and
examining and improving a quality of an audio or audio/visual stream stored in the audio/visual collection and identifying at least one of: a profile of the stream, voice over sections of the stream, degraded sections of the stream, and commercial detection,
wherein improving the quality of the audio or audio/visual stream stored in the audio/visual collection comprises comparing a title in the audio or audio/visual recording collection (48, 50) to a title stored in a real time file system or a common memory and either:
(i) replacing a title in the audio or audio/visual recording collection with a title stored in the real time file system or the common memory or
(ii) replacing portions of the title in the audio or audio/visual recording collection (48, 50) in order to remove voice over portions or defects of any kind or commercials, and wherein the operation of the content analysis means and replacing of either the said title (i), or portion of the title (ii), in the audio or audio/visual recording collection, is performed without the user being required to have previously listened to, or listened to and/or watched, the said title (i) or portions of the title (ii).

12. The method as set forth in claim 11, wherein the step of maintaining a user profile further includes:
maintaining one or more virtual channels, each virtual channel configured according to specific user preferences and including stored audio or audio/video collection streams matching the specific user preferences.

13. The method as set forth in claim 12, wherein the step of storing the queued stream includes:
selectively adding the stored stream to the virtual channels.

14. The method as set forth in claim 11, wherein the step of maintaining a user profile further includes:
maintaining a most-popular list including a configured number of stored audio or audio/video collection streams most often received.

15. The method as set forth in claim 11, further including at least one of:
identifying each of the audio or audio/visual streams by matching its fingerprint to a local fingerprint database entry;
identifying each of the audio or audio/visual streams by matching its fingerprint to a remote fingerprint database entry; and,
subtracting the video portion from an audio or audio/visual stream to produce an audio stream.

16. A personal recording and playback system (10) comprising:
a receiving means (19, 21) for receiving streaming audio/visual input from at least one of broadcast radio, broadcast TV stations, cable TV systems, satellite TV systems, the Internet, and other wide-area networks:
a means (21) for connecting to wide area networks including the Internet and receiving streaming audio or audio/visual input;
a storage means (36) for storing the received streaming audio or audio/visual input;
a user input means (12) for inputting user commands to the recording/playback system (10);
a user output means (14) for outputting the audio or audio/visual input;
a recording means (32) for transparently:
tracking audio or audio/visual preferences of a user of the system (10);
maintaining a user profile database (34) for storing and maintaining user preferences;
receiving multiple audio or audio/visual streams via the receiving means (19, 21) and storing the received multiple audio or audio/visual streams on the storage means (36) in the background; and,
maintaining an audio or audio/visual recording collection (48, 50) according to the user preferences by analyzing the received audio/visual streams; and
a content analysis means (56) for examining and improving a quality of an audio or audio/visual stream stored in the recording collection and identifying at least one of: a profile of the stream, and voice over sections of the stream, degraded sections of the stream, and commercial detection,
wherein the content analysis means (56) improves the quality of the audio or audio/visual stream stored in the recording collection by comparing a title in the audio or audio/visual recording collection (48, 50) to a title stored in a real time file system or a common memory and replacing portions of the title in the audio or audio/visual recording collection in order to remove voice over portions or defects of any kind or commercials and wherein the operation of the content analysis means and replacing of the title, or portion of the title, in the audio or audio/visual recording collection, is performed without the user being required to have previously listened to, or listened to and/or watched, the said title or portions of the title.

* * * * *